(12) United States Patent
Chae et al.

(10) Patent No.: US 9,857,920 B2
(45) Date of Patent: Jan. 2, 2018

(54) METHOD AND APPARATUS FOR PROVIDING USER INTERFACE USING ACOUSTIC SIGNAL, AND DEVICE INCLUDING USER INTERFACE

(75) Inventors: Seung Chul Chae, Seoul (KR); Sun Jae Lee, Suwon-si (KR); Kyung Ah Chang, Seoul (KR); Ho Sub Lee, Yongin-si (KR); Hyun Jin Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 976 days.

(21) Appl. No.: 13/019,566

(22) Filed: Feb. 2, 2011

(65) Prior Publication Data

US 2011/0191680 A1 Aug. 4, 2011

(30) Foreign Application Priority Data

Feb. 2, 2010 (KR) .................. 10-2010-0009545
Aug. 27, 2010 (KR) .................. 10-2010-0083609

(51) Int. Cl.
*G06F 3/043* (2006.01)
*G06F 3/0488* (2013.01)
*G10L 17/26* (2013.01)

(52) U.S. Cl.
CPC ........ *G06F 3/0436* (2013.01); *G06F 3/04883* (2013.01); *G10L 17/26* (2013.01)

(58) Field of Classification Search
CPC .............................. G06F 3/043; G06F 3/04883
USPC ........................................................ 345/177
See application file for complete search history.

(56) References Cited

U.S. PATENT DOCUMENTS

| | | | | |
|---|---|---|---|---|
| 4,654,648 A | * | 3/1987 | Herrington et al. | ........... 345/179 |
| 4,718,102 A | * | 1/1988 | Crane | .................. G06K 9/6807 |
| | | | | 382/185 |
| 4,772,764 A | * | 9/1988 | Dorr | ..................... G01S 15/876 |
| | | | | 178/18.04 |
| 5,541,892 A | * | 7/1996 | Kobayashi et al. | ........... 367/127 |
| 5,750,941 A | | 5/1998 | Ishikawa et al. | |
| 5,854,450 A | * | 12/1998 | Kent | ............................ 178/18.04 |
| 6,313,825 B1 | * | 11/2001 | Gilbert | ........................... 345/156 |

(Continued)

FOREIGN PATENT DOCUMENTS

| | | |
|---|---|---|
| CN | 1409839 A | 4/2003 |
| CN | 101529363 A | 9/2009 |

(Continued)

OTHER PUBLICATIONS

European Search Report dated Dec. 10, 2012, issued in counterpart European Patent Application No. 12 182 555.8; 6 pages in English language.

(Continued)

*Primary Examiner* — Nicholas Lee
*Assistant Examiner* — Robert Stone
(74) *Attorney, Agent, or Firm* — NSIP Law

(57) ABSTRACT

A user interface using an acoustic signal is provided. A device with the user interface includes a sensor to acquire a surface acoustic signal generated outside of the device, and at least one processor. The processor classifies patterns of the surface acoustic signal by analyzing features of the surface acoustic signal, and identifies a user's input signal corresponding to the surface acoustic signal based on the pattern of the surface acoustic signal.

21 Claims, 13 Drawing Sheets

(56) References Cited

U.S. PATENT DOCUMENTS

| | | | |
|---|---|---|---|
| 6,429,846 B2 * | 8/2002 | Rosenberg et al. ............ 345/156 |
| 6,703,570 B1 * | 3/2004 | Russell ..................... G01S 5/18 |
| | | | 178/18.01 |
| 7,050,177 B2 * | 5/2006 | Tomasi et al. ................ 356/614 |
| 7,353,709 B2 * | 4/2008 | Kruger ..................... G01N 29/11 |
| | | | 73/599 |
| 7,411,581 B2 * | 8/2008 | Hardie-Bick ................ 345/173 |
| 8,890,821 B2 * | 11/2014 | Chang ..................... G06F 3/0416 |
| | | | 178/18.01 |
| 2001/0003452 A1 | 6/2001 | Linge |
| 2001/0006006 A1 * | 7/2001 | Hill ........................ G06F 3/0433 |
| | | | 73/606 |
| 2002/0009227 A1 * | 1/2002 | Goldberg ............ G06F 3/04883 |
| | | | 382/181 |
| 2002/0075240 A1 * | 6/2002 | Lieberman et al. .......... 345/170 |
| 2003/0016437 A1 * | 1/2003 | Islam ...................... H01S 3/302 |
| | | | 359/334 |
| 2003/0066692 A1 * | 4/2003 | Devige ................. G06F 3/0433 |
| | | | 178/18.04 |
| 2003/0132921 A1 * | 7/2003 | Torunoglu et al. ............ 345/173 |
| 2003/0217873 A1 * | 11/2003 | Paradiso ............... G06F 3/0433 |
| | | | 178/18.04 |
| 2004/0047505 A1 * | 3/2004 | Ghassabian .............. G06K 9/00 |
| | | | 382/186 |
| 2004/0246240 A1 * | 12/2004 | Kolmykov-Zotov |
| | | | ........................... G06F 3/03545 |
| | | | 345/179 |
| 2005/0078093 A1 * | 4/2005 | Peterson ................. G06F 3/043 |
| | | | 345/173 |
| 2006/0192763 A1 * | 8/2006 | Ziemkowski ................ 345/168 |
| 2006/0210163 A1 * | 9/2006 | Garside ............... G06F 3/04883 |
| | | | 382/186 |
| 2007/0006651 A1 * | 1/2007 | Kruger et al. .................. 73/579 |
| 2007/0173240 A1 * | 7/2007 | Lim ........................ G06F 3/018 |
| | | | 455/418 |
| 2008/0084789 A1 * | 4/2008 | Altman ............... G06F 3/03545 |
| | | | 367/127 |
| 2008/0309641 A1 | 12/2008 | Harel et al. |
| 2009/0195517 A1 * | 8/2009 | Duheille et al. ............. 345/177 |
| 2009/0256815 A1 * | 10/2009 | Westerinen ............. G06F 3/044 |
| | | | 345/174 |
| 2009/0295758 A1 * | 12/2009 | Lee ....................... G06F 3/0317 |
| | | | 345/177 |
| 2010/0019922 A1 | 1/2010 | Van Loenen et al. |
| 2011/0037734 A1 * | 2/2011 | Pance et al. .................. 345/177 |
| 2011/0084940 A1 * | 4/2011 | Lee ............................. 345/177 |
| 2011/0096954 A1 * | 4/2011 | Dahl ...................... G06F 3/017 |
| | | | 382/103 |
| 2011/0175813 A1 * | 7/2011 | Sarwar et al. ................ 345/168 |
| 2011/0242059 A1 * | 10/2011 | Pasquero .............. G06F 3/0233 |
| | | | 345/177 |
| 2012/0056804 A1 * | 3/2012 | Radivojevic et al. ........ 345/156 |
| 2014/0363083 A1 * | 12/2014 | Xia .................... G06K 9/00436 |
| | | | 382/189 |

FOREIGN PATENT DOCUMENTS

| | | |
|---|---|---|
| EP | 0 421 025 A1 | 4/1991 |
| JP | 3385094 | 12/2002 |
| JP | 2005-18611 A | 1/2005 |
| JP | 2005-529350 A | 9/2005 |
| JP | 2007312309 | 11/2007 |
| JP | 2007-336513 | 12/2007 |
| JP | 2010-507163 A | 3/2010 |
| KR | 10-1998-0019048 | 6/1998 |
| KR | 10-2009-0042854 | 4/2009 |
| WF | WO 2008/047294 A2 | 4/2008 |
| WO | WO2009115799 * | 9/2009 ............. G06F 3/043 |

OTHER PUBLICATIONS

PCT International Search Report issued for International Application No. PCT/KR2011/000680 dated Feb. 1, 2011 (3 pages).

Chinese Office Action dated Sep. 27, 2013 in counterpart Chinese Patent Application No. 201180008099.4.

Japanese Office Action dated Jan. 6, 2015, in counterpart Japanese Application No. 2012-551100 (3 pages in English, 4 pages in Japanese).

European Office Action dated May 17, 2017 in corresponding European Patent Application No. 1218255.8 (5 pages in English).

* cited by examiner

< MINIMAL MEANINGFUL UNIT >

METHOD AND APPARATUS FOR PROVIDING USER INTERFACE USING ACOUSTIC SIGNAL, AND DEVICE INCLUDING USER INTERFACE

CROSS-REFERENCE TO RELATED APPLICATION(S)

This application claims the benefit under 35 U.S.C. §119 (a) of Korean Patent Application No. 10-2010-0009545, filed on Feb. 2, 2010, and of Korean Patent Application No. 10-2010-0083609, filed on Aug. 27, 2010, in the Korean Intellectual Property Office, the entire disclosures of which are incorporated herein by reference for all purposes.

BACKGROUND

1. Field

The following description relates to providing a user interface using an acoustic signal, for example, a surface acoustic signal.

2. Description of Related Art

Apparatuses for providing a user interface to operate an electronic device to perform functions have been developed mainly in the form of an operation key, a button, a mouse, or a touch screen. Since conventional user interface providing apparatuses typically include an electronic circuit employing a device such as a button and a screen, there is therefore a limited area in which a user may input a command. In other words, there is a limit in that an area in which such an input device of the electronic circuit is not installed cannot be used as an interface, i.e., cannot be used as an input range. Also, when an interface apparatus is built in a curved area, rather than a flat surface, and in a general object such as a piece of furniture or a wall, the user interface needs to be durable against impacts and contaminants. Such qualities are, however, difficult to achieve.

The conventional user interface providing apparatuses operate in the state of being fixed to a predetermined region of the electronic device. To this end, if an interface of the electronic device, that is, the input range, is disposed in a location difficult for a user to reach, such as inside of clothes or a bag, the interface becomes inconvenient to operate. In particular, when the electronic device has a limited amount of space, for example, as in a mobile device, it is difficult to secure sufficient input space.

Accordingly, there is a desire for an interfacing technology capable of overcoming the limit of the input space of the interface and reducing the cost in comparison with conventional interface devices.

SUMMARY

In one general aspect, there is provided an apparatus to provide a user interface of a device, including a surface acoustic signal acquisition unit to acquire a surface acoustic signal generated from a medium disposed outside of the device, a pattern recognition unit to recognize a pattern of the surface acoustic signal by analyzing features of the surface acoustic signal, and a user input identification unit to identify a user's input signal based on the pattern of the surface acoustic signal.

The medium may be provided to the user through an object contacting the device.

The surface acoustic signal acquisition unit may include a medium contactor to receive the surface acoustic signal by contacting the object, and an acoustic sensor to convert the surface acoustic signal to a digital signal.

The medium may be provided to the user through an external casing of the device.

The pattern recognition unit may include a feature extractor to extract a time-domain feature and/or a frequency-domain feature, and a pattern analyzer to analyze the pattern of the surface acoustic signal based on the time-domain feature and/or the frequency-domain feature.

The time-domain feature may include an amplitude of the surface acoustic signal, a distribution of a zero-crossing, an amount of energy, a length of the surface acoustic signal, or a shape of the surface acoustic signal.

The pattern recognition unit may determine a type of the medium using a test signal, and may recognize the pattern of the surface acoustic signal based on the type of the medium.

The pattern recognition unit may estimate a tool generating the surface acoustic signal based on frequency-domain features of the surface acoustic signal, and may recognize the pattern of the surface acoustic signal based on the tool.

The user input identification unit may classify minimal meaningful units matching the pattern of the surface acoustic signal and identifies the user's input signal based on the minimal meaningful units.

The user input identification unit may identify the user's input signal by receiving a plurality of patterns sequentially from the pattern recognition unit and by combining minimal meaningful units corresponding to the plurality of patterns.

The pattern may include information corresponding to a direction of the surface acoustic signal, and the user input identification unit may identify the user's input signal based on the information corresponding to the surface acoustic signal direction.

The apparatus may further include a pattern model storage unit to store pattern models of the surface acoustic signal, classified according to a type of the medium and/or an input tool.

The user's input signal may include a character, a figure, a dragging, a touch event, or any combination thereof, which are input through the medium.

In another general aspect, a method of providing a user interface of a device includes acquiring a surface acoustic signal, extracting a time-domain feature and/or a frequency-domain feature of the surface acoustic signal, analyzing a pattern of the surface acoustic signal based on the time-domain feature and/or the frequency-domain feature, and identifying a user's input signal based on the pattern of the surface acoustic signal.

The analyzing of the pattern of the surface acoustic signal may include determining a type of a medium by using a test signal, estimating a type of a tool that generated the surface acoustic signal based on frequency-domain features of the surface acoustic signal, and recognizing a pattern of the surface acoustic signal based on the type of the medium and/or the tool that generated the surface acoustic signal.

The identifying may include receiving a plurality of patterns sequentially, and identifying the user's input signal by combining minimal meaningful units corresponding to the patterns.

In another general aspect, a method of providing a user interface of a device includes performing an external input mode that receives a user's input signal from a medium disposed outside of the device, recognizing a pattern of a surface acoustic signal corresponding to the medium by analyzing features of the surface acoustic signal in response to the surface acoustic signal being received from the medium, and identifying a user's input signal based on the pattern of the surface acoustic signal.

In another general aspect, a method of providing a user interface of a device includes performing an external input mode that receives a user's input signal from a medium disposed outside of the device, determining a direction of a surface acoustic signal in response to the surface acoustic signal being received from the medium, and performing a function of the device corresponding to the direction of the surface acoustic signal.

The direction of the surface acoustic signal may be determined by a shape of a waveform of the surface acoustic signal, a time difference between a first surface acoustic signal received by a first acoustic sensor and a second surface acoustic signal received by a second acoustic sensor, variation of sizes of the first surface acoustic signal and the second surface acoustic signal, or any combination thereof.

In another general aspect, a device provided with a user interface includes a sensor to acquire a surface acoustic signal generated outside of the device, and at least one processor configured to classify a pattern of the surface acoustic signal by analyzing features of the surface acoustic signal and to identify a user's input signal corresponding to the surface acoustic signal based on the pattern of the surface acoustic signal.

In another general aspect, a method of providing a user interface of a device includes acquiring an acoustic signal generated by a user from outside of the device, analyzing the acquired acoustic signal, and identifying the user's input signal based on the analyzed acoustic signal.

The acoustic signal may be generated by contact between a medium and the user's hand.

The acoustic signal may be generated by contact between a medium and a tool being used by the user.

The acoustic signal may be acquired in a state in which the device is in contact with a medium contacted by the user.

The acoustic signal may be a surface acoustic signal.

In another general aspect, there is provided a device provided with a user interface, including a sensor to sense a surface acoustic signal, and a recognition unit to recognize a user input corresponding to the surface acoustic signal.

The surface acoustic signal may originate from a casing enclosing the device.

The surface acoustic signal may originate from a point remote from the device.

The recognition unit may recognize the user input according to a Location Template Matching scheme and/or a Time Difference of Arrival scheme.

In another general aspect, a method of providing a user interface of a device includes sensing a surface acoustic signal, and recognizing a user input corresponding to the surface acoustic signal.

The recognizing the user input may include analyzing the surface acoustic signal to determine a tool used to generate the surface acoustic signal.

The recognizing the user input may include determining a type of medium outside the device, and analyzing the surface acoustic signal according to the type of medium.

At least two sensors may be used to sense the surface acoustic signal, and the recognizing the user input may be performed according to a spatial difference between the at least two sensors.

Other features and aspects will be apparent from the following detailed description, the drawings, and the claims.

Figure 1:
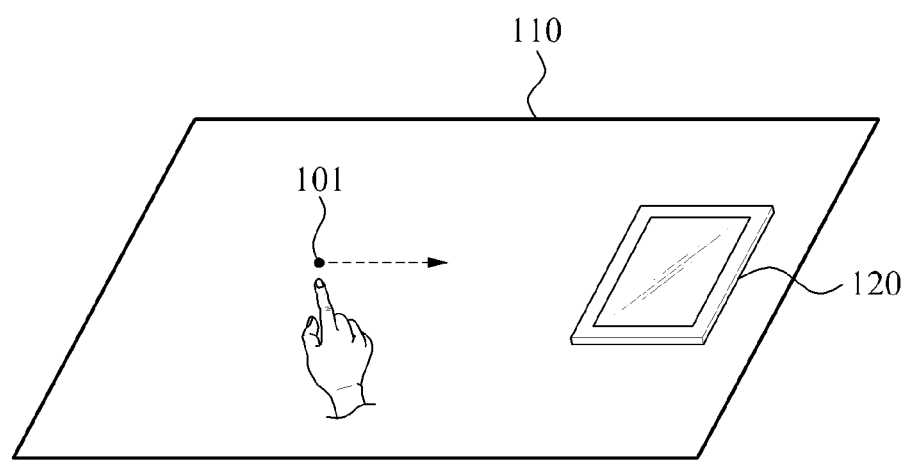
FIG. 1 is a diagram illustrating an example of an extended interface using a surface acoustic signal.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of operations described is an example; however, the sequence of operations is not limited to that set forth herein and may be changed as is known in the art, with the exception of operations necessarily occurring in a certain order. Also, description of well-known functions and constructions may be omitted for increased clarity and conciseness.

In the following description, "devices" may include a portable device, an electronic device, and the like. A user interface providing apparatus may be a component of the device. That is, the user interface providing apparatus may provide a user interface of the device. The term "device" may include all devices operational by a user, for example, a mobile terminal, a tablet PC, a portable media player, a home appliance, and the like.

FIG. 1 is a diagram illustrating an example of an interface using a surface acoustic signal.

Referring to FIG. 1, a device 120 may be disposed on an object 110 that includes a specific medium. The object 110 may be, for example, a table, a desk, and the like. A surface acoustic signal, caused by, for example, a user's gesture, may be generated from a surface of the object 110. The user's gesture may include various touch events such as dragging, tapping, etc., for a character input. The surface acoustic signal may be propagated regardless of a shape of the medium, and through all types of the medium, such as air, glass, metal, wood, and the like.

In the example described with reference to FIG. 1, the surface acoustic signal generated by the user's gesture may correspond to a 'user's input signal' used to operate the device 120. The device 120 may perform a function corresponding to the user's input signal. To perform the function corresponding to the user's input signal, the device may be equipped with a function to acquire the user's input signal through an extended interface and a function to identify the user's input signal. In other words, the available interface may be extended away from the physical boundaries of the device itself. The device 120 may precisely understand the user's intention by identifying the user's input signal.

In the example of FIG. 1, the device 120 may include a sensor to acquire the surface acoustic signal, and at least one processor configured to identify the user's input signal. Additionally, the device 120 may further include a display to indicate the user's input signal or display the operation and/or the function corresponding to the input signal. In this example, the at least one processor may be configured to classify patterns of the surface acoustic signal by analyzing features of the surface acoustic signal, and may identify the user's input signal based on the pattern of the surface acoustic signal. In other words, the surface acoustic signal generated by the user's gesture may be used as an input signal to execute a command to operate the device 120, a character input, and/or other various functions.

The device 120 may acquire an acoustic signal generated by the user from a medium which is independent of the device 120, analyze the acquired acoustic signal, and identify the user's input signal based on the analyzed acoustic signal. The acoustic signal may be generated by contact between the medium and the user's hand. Also, the acoustic signal may be generated by contact between the medium and a tool being used by the user. The tool used by the user may be, for example, a stylus or other such body used to simulate writing, drawing, etc. The acoustic signal may be a surface acoustic signal generated from a surface of the medium.

Figure 2:
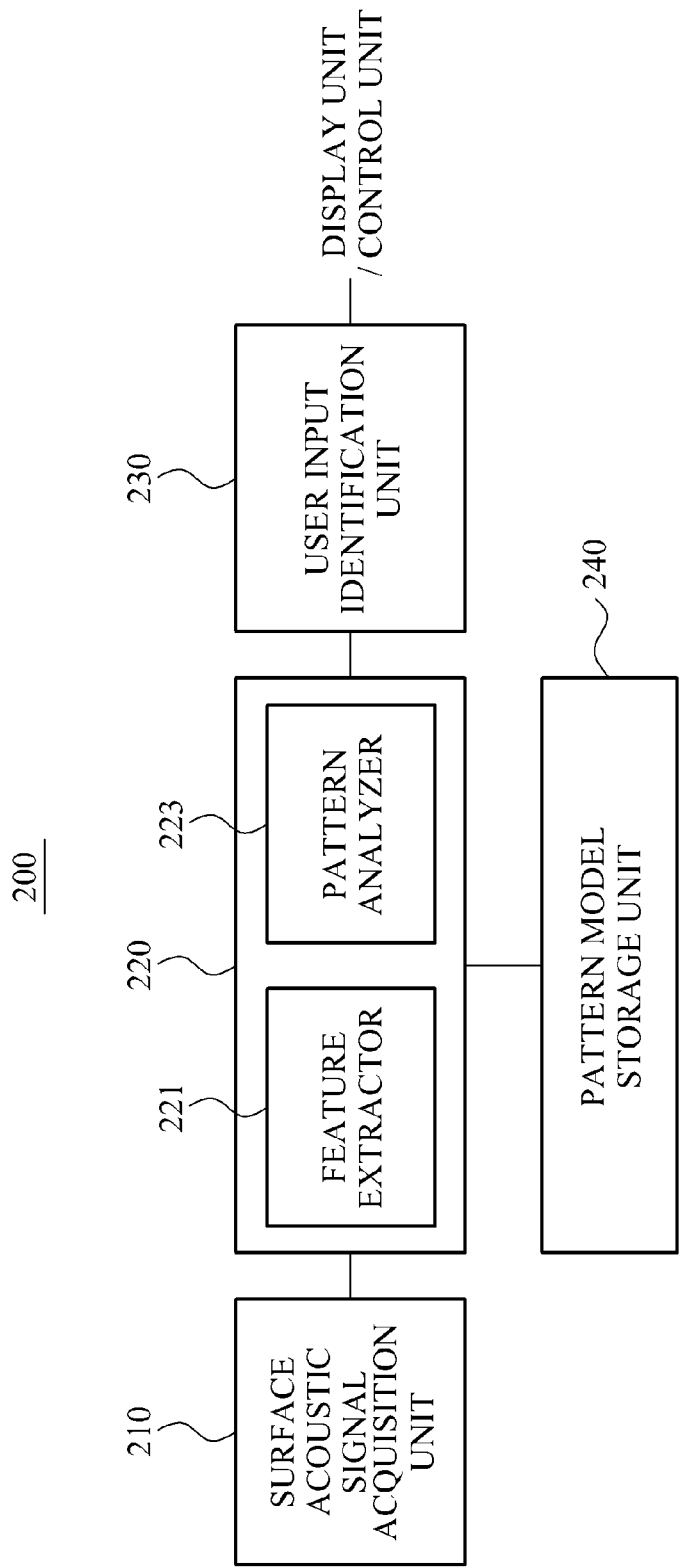
FIG. 2 is a diagram illustrating an example of a user interface providing apparatus.

FIG. 2 is a diagram illustrating an example of a user interface providing apparatus.

The user interface providing apparatus illustrated in FIG. 2 may be provided in the device 120 of FIG. 1.

Referring to FIG. 2, the user interface providing apparatus 200 may include a surface acoustic signal acquisition unit 210, a pattern recognition unit 220, and a user input identification unit 230. The user interface providing apparatus 200 may further include a pattern model storage unit 240.

The surface acoustic signal acquisition unit 210 may acquire a surface acoustic signal generated from a medium disposed outside of the device. The medium may correspond to an extended interface provided to the user through an object contacting the device. Alternatively, or in conjunction with such an extended interface, the medium may be provided to the user through an external casing of the device. The surface acoustic signal acquisition unit 210 may include at least one acoustic sensor. In such a case, the surface acoustic signal may be easily acquired in response to the device 120 being in contact with the medium, and may also be acquirable even when the device 120 is physically separated from the medium. For example, the surface acoustic signal may be acquired even in a case in which the device 120 is physically separated from the medium due to being held by the user.

The pattern recognition unit 220 may analyze features of the surface acoustic signal, and may thereby recognize a pattern of the surface acoustic signal corresponding to the medium. The pattern recognition unit 220 may include a feature extractor 221 to extract time-domain features and/or of frequency-domain features of the surface acoustic signal, and a pattern analyzer 223 to analyze the pattern of the surface acoustic signal based on the time-domain features and/or the frequency-domain features of the surface acoustic signal. The pattern recognition unit 220 may further include a surface acoustic signal processor (not illustrated) to perform operations related to noise removal, signal amplification, signal simplification, and the like. The time-domain features may include an amplitude of the surface acoustic signal, distribution of the zero-crossing, an amount of energy, a length of the surface acoustic signal, a shape of the surface acoustic signal, and the like.

The pattern recognition unit 220 may perform "extraction of the features of the surface acoustic signal," "estimation of a type of a tool that generated the surface acoustic signal," and "estimation of a type of a medium propagating the surface acoustic signal." Accordingly, the pattern recognition unit 220 may precisely recognize the pattern of the surface acoustic signal despite variation of an input tool or a medium.

The user input identification unit 230 may identify the user's input signal based on the surface acoustic signal. The user input identification unit 230 may classify "minimal meaningful units" matching the pattern of the surface acoustic signal and identify the user's input signal based on the "minimal meaningful units." In addition, the user input identification unit 230 may identify the user's input signal by sequentially receiving a plurality of patterns from the pattern recognition unit 220 and combining the "minimal meaningful units" respectively corresponding to the plurality of patterns. The identified user's input signal may be transmitted to the display and a controller equipped to the device. If the user's input signal is a character, the character input by the user may be displayed. If the user's input signal is a command to execute a specific function, the control unit may execute the function.

The pattern model storage unit 240 may store pattern models of the surface acoustic signals, classified by types of the medium and the input tool. In other words, the pattern model storage unit 240 may store the pattern models of each of the surface acoustic signals that are generated by various mediums and various input tools. For example, pattern models for various letters and/or numbers corresponding to a wooden table top and a plastic stylus may be stored in the pattern model storage unit 240.

Hereinafter, the "extraction of the features of the surface acoustic signal," the "estimation of a type of a tool that generated the surface acoustic signal," and the "estimation of a type of the medium propagating the surface acoustic signal" performed by the user interface providing apparatus 200 will be further described. Next, "identification of the user's input signal" performed by the user interface providing apparatus 200 will be further described.

<1. Extraction of Features of Surface Acoustic Signal>

In a process of the extraction of the features of the surface acoustic signal, features beneficial in analysis of the pattern of the surface acoustic signal may be extracted from the surface acoustic signal. According to an example, the extraction may be performed by a hardware device such as a digital signal processor (DSP), a software device, a unit programmed for the hardware device, and so on. For convenience of description, it is presumed herein that the extraction of the features of the surface acoustic signal is performed by the feature extractor 221.

Figure 6:
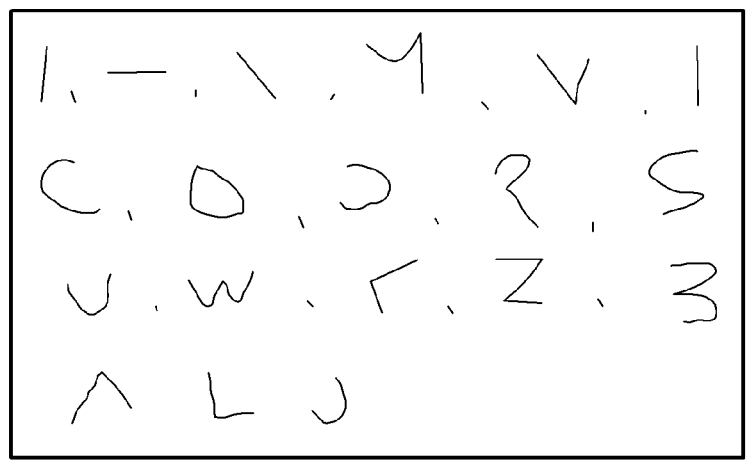
FIG. 6 is a diagram illustrating examples of minimal meaningful units.

The features of the surface acoustic signal may be classified into the "minimal meaningful units" having specific meanings. The "minimal meaningful unit" is defined as a most basic form beneficial in identification of the user's input signal. As illustrated in FIG. 6, which will be discussed in more detail later in this description, the "minimal meaningful unit" may include units of the surface acoustic signal, each having a minimal meaning, such as a dot, a circle, a straight line, an alphabet, and the like.

The surface acoustic signal may be acquired as the user artificially generates a sound on a surface of the medium using an object such as a hand and/or a pen. For extraction of the features of the surface acoustic signal, the signal may be analyzed and may be separated into minimal meaningful units. Various minimal meaningful units may each have a unique pattern. Therefore, the feature extractor 221 may be capable of extracting the features from the surface acoustic signal and classifying the minimal meaningful units using the extracted features.

According to an example, the minimal meaningful units may be extracted through five processes described below.

1. A signal S of the minimal meaningful unit may be separated from the acquired surface acoustic signals.
2. The signals S of the minimal meaningful units may be separated into N-number of frames.
3. Feature values $C_N$ of each of the N-number of frames may be extracted and stored.
4. Feature values $C_T$ of all the acquired surface acoustic signals may be extracted and stored.
5. In response to the pattern model of the minimal meaningful unit being stored in a database (DB), a machine learning model M may be generated using the values $C_N$ and $C_T$ and the machine learning model M may be stored in the DB.

The above five processes may also be used to store the pattern model of the minimal meaningful unit in the DB. In other words, each pattern model of different mediums and input tools may be stored in the DB The pattern of the surface acoustic signal being currently input may be recognized through comparison between the features extracted from the surface acoustic signal being currently input and the "pattern model of the minimal meaningful unit" stored in the DB.

In the above five processes, the term "feature value" may be a temporally normalized value of the time-domain features of the corresponding signal. Also, the "feature value" may be the frequency-domain features of the corresponding signal. The "pattern model of the minimal meaningful unit" may be generated by properly combining the time-domain features with the frequency-domain features and using various machine learning techniques. The time-domain features may include a standard deviation and a wave slope among amplitudes, dynamic ranges of the amplitudes, distribution of the amplitudes, distribution and variation of the zero-crossing, a sum and variation of energy, a signal length, and the like.

For example, an acoustic signal has a strength level which can be used as a feature value. The number of discrete signal values (amplitude) can be taken from the acoustic signal, and changes between signal values can be measured. The variation of the amplitudes of the signals may be used to identify a straight line, a curve line, a bent line, and the like being input onto the medium.

The feature extractor 221 may classify similar signals using the amplitude distribution of the corresponding signal. For example, distribution of amplitudes of a signal corresponding to a circle may have a uniform distribution.

Distribution of the zero-crossing denotes the number of spots at which a sign of a signal changes. In other words, the zero-crossing denotes a spot at which a signal level reaches zero in one frame. Distribution of the zero-crossing shows a ratio of a high frequency and a low frequency of the signal. For example, presuming that 'N' denotes a length of time, the distribution of the zero-crossing may be defined by Equation 1 below.

$$ZCR = \frac{1}{2(N-1)} \sum_{m=1}^{N} |\text{sign}[x(m+1)] - \text{sign}[x(m)]| \quad \text{[Equation 1]}$$

The feature extractor 221 may extract specific features of the corresponding signal using the zero-crossing distribution, variation of the zero-crossing distribution, and the like.

The feature extractor 221 may use a total sum of energy of the signal as the features of the signal. When 'N' denotes a length of time, the total sum of energy of a discrete signal X(i) during the time N may be calculated by Equation 2 as below.

$$v[n] = \sqrt{\frac{1}{N} \sum_{i=0}^{N-1} x_n^2(i)} \quad \text{[Equation 2]}$$

In addition, the feature extractor 221 may use an amount of energy in each of the frames as the features of the signal.

The feature extractor 221 may differentiate the signal through a length of the signal. Time may be a unit for the signal length. For example, a point and a circle have obviously different signal lengths from each other. Therefore, the feature extractor 221 may determine, as the length of the surface acoustic signal, a period of time from a point in time of beginning the acquisition of the surface acoustic signal to a point in time of finishing the acquisition of the surface acoustic signal.

The time-domain features of the signal may be normalized in reference time units and the normalized value may be stored in the DB. In this case, a size of the stored data may be reduced. For example, in a case in which a long straight line and a short straight line exist, features of a straight line may be first recognized, and then relative lengths may be measured using length information.

The frequency-domain features of the signal may be recognized through Fourier transform, spectrum analysis, and the like.

<2. Estimation of Type of Medium Propagating Surface Acoustic Signal>

Estimation of the medium type may be performed by comparing the features extracted from the surface acoustic signal with the pattern model. An input medium used to generate the surface acoustic signal may include a single medium such as glass, a compound medium such as a desk, and the like. The surface acoustic signal may be changed by a shape of surface of the medium. Estimation of the medium type may be performed by any of a hardware device such as a DSP, a software device, and a unit programmed for the hardware device. However, for convenience of description, it is presumed herein that the estimation of the medium type is performed by the pattern recognition unit 220.

The pattern recognition unit 220 may determine the medium type using a test signal and recognize the pattern of the surface acoustic signal based on the medium type. For example, the medium type may be estimated through three processes described below.

1. A test signal may be generated.
2. The surface acoustic signal propagating through the medium in contact with the device may be acquired.
3. Features from the surface acoustic signal acquired in process 2 may be obtained, and the matching medium may be searched for in the DB.

The test signal may be generated by a speaker or a vibration generator provided in or to the device. The test signal may be an acoustic signal of a pre-defined signal having a short period, a vibration, and/or the like. The surface acoustic signal corresponding to the test signal may be acquired by a microphone and a piezoelectric sensor provided in or to the device.

The pattern recognition unit 220 may estimate the type of the medium contacting the device by calculating a distribution range of frequency, the amplitude, and transmission speed of the surface acoustic signal acquired in process 2 and comparing the data with the model stored in the DB. In a case in which there is no model matching the features of the surface acoustic signal acquired in process 2, the pattern recognition unit 220 may determine a most similar model as the medium contacting the device. Such a determination may be made by comparing the acquired distribution range of frequency, amplitude, and transmission speed with corresponding attributes of various models stored in the DB.

If the estimation of the medium type is periodically performed, variation of the medium may be estimated substantially in real time.

<3. Estimation of a Type of a Tool that Generated Surface Acoustic Signal>

Estimation of a type of a tool that generated the surface acoustic signal may be performed by estimating the user's input signal. The input tool may be a finger, a pen, a stylus, or other various tools. That is, the user is capable of operating the device through various input tools such as his or her finger and a stylus. Estimation of a type of a tool may be performed by a hardware device such as a DSP, a software device, a unit programmed for a hardware device, and the like. However, for convenience of description, it is presumed herein that the estimation of a type of a tool is performed by the pattern recognition unit 220.

The pattern recognition unit 220 may perform an estimation of a type of a tool that generated the surface acoustic signal based on the frequency-domain features of the surface acoustic signal, and may recognize the pattern of the surface acoustic signal considering the tool generating the surface acoustic signal.

Frequency features of the signal may be extracted through various methods. For example, the frequency features may be extracted by Discrete Fourier transforming (DFT) the corresponding signal. Also, the frequency features may be extracted using a total power spectrum, a sub-band power, a center frequency, a bandwidth, a spectrum flux, and the like. The frequency features of the input tools may be stored in the DB through a machine learning model.

Various examples of the frequency-domain features of the input tool will be further described with reference to FIG. 7.

<4. Identification of User's Input Signal>

The identification of the user's input signal determines the user's intention or gesture. The user's input signal may include a simple dragging, character input, tapping, a particular touch event, and the like. The device is able to perform various functions by recognizing the user's input signal.

For example, the device may be set to perform a predetermined function when the user performs dragging from the left to the right on the surface of the medium contacting the device. A dragging direction may be recognized by estimating the direction of the surface acoustic signal. The direction of the surface acoustic signal may be recognized by a single acoustic signal or by a plurality of surface acoustic signals. That is, the pattern of the surface acoustic signal may include information regarding the direction of the surface acoustic signal. The user input identification unit 230 may identify the user's input signal based on the information regarding the direction of the surface acoustic signal.

For example, in a case in which the user inputs a character on the surface of the medium contacting the device, the character may be identified using the "minimal meaningful unit."

Figure 3:
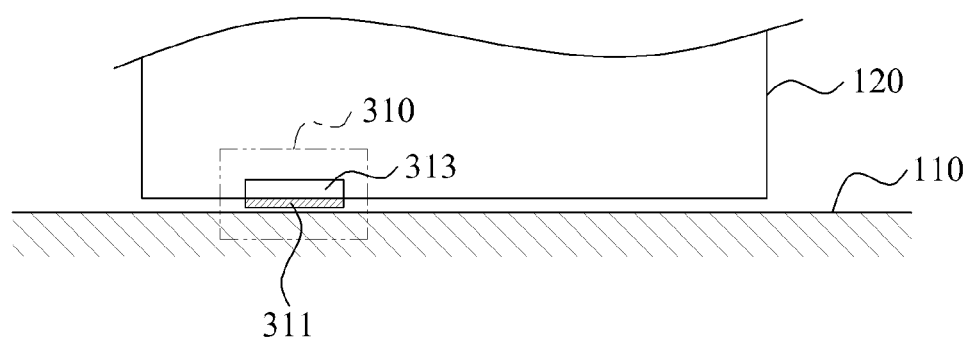
FIG. 3 is a diagram illustrating an example structure of a surface acoustic signal acquisition unit illustrated in FIGS. 1 and 2.

FIG. 3 illustrates an example of the structure of the surface acoustic signal acquisition unit 210 of FIGS. 1 and 2.

Referring to FIG. 3, the surface acoustic signal acquisition unit 210 may include a medium contactor 311 and an acoustic sensor 313.

The medium contactor 311 may receive the surface acoustic signal by contacting the object 110. The medium contactor 311 may be made of various materials capable of maintaining close contact with the object 110.

The acoustic sensor 313 may convert the surface acoustic signal to a digital signal. A condenser type microphone, an electronic microphone, a piezoelectric sensor, an ultrasonic sensor, and the like may be used as the acoustic sensor 313. The condenser type microphone and the electronic microphone are noise sensors that may convert a pressure degree of a sound propagating through the medium such as air into an electrical signal. The piezoelectric sensor is a vibration sensor that may convert a pressure obtained from vibration generated by a person or an object to an electrical signal. The ultrasonic sensor may determine a distance or position of an acoustic signal by sensing an ultrasonic wave which is inaudible to human beings.

Figure 4:
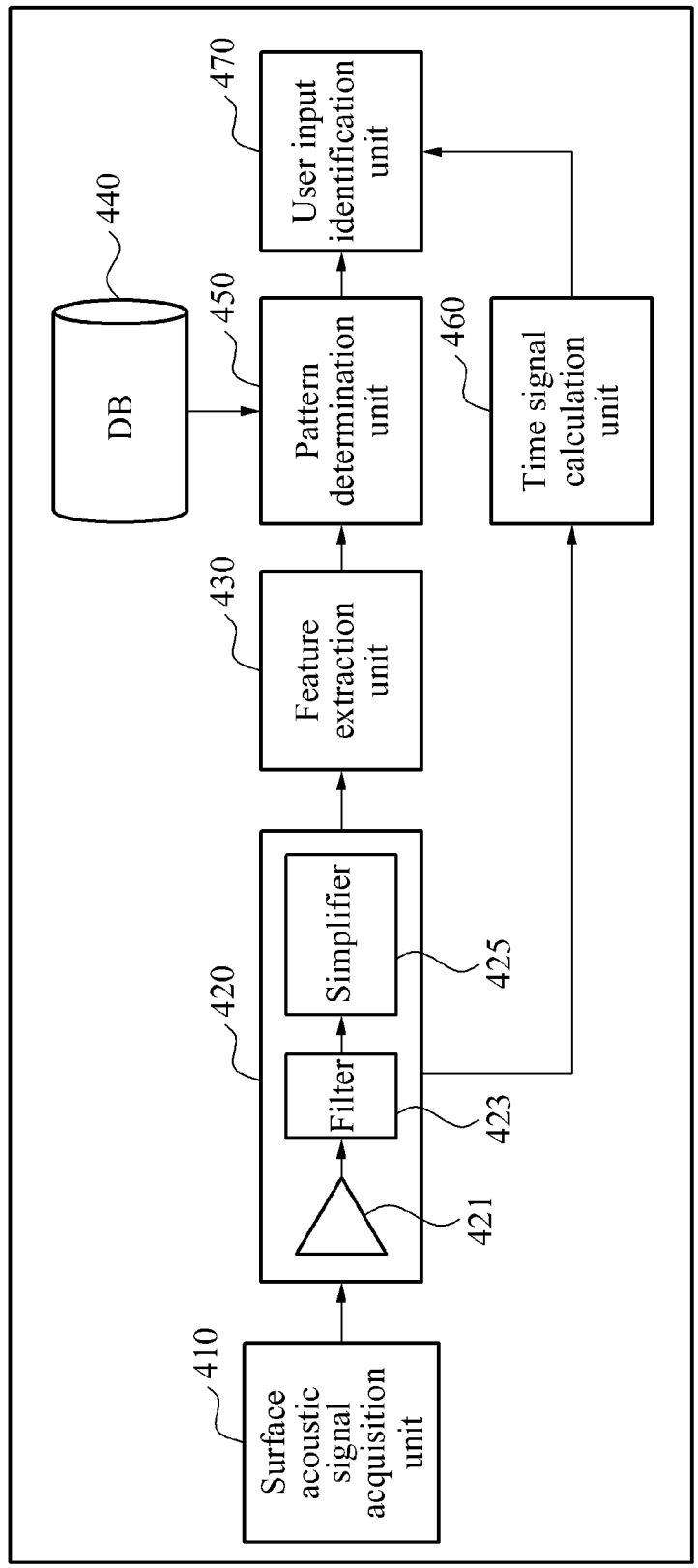
FIG. 4 is a diagram illustrating the structure of an example user interface providing apparatus.

FIG. 4 illustrates the structure of an example user interface providing apparatus.

As illustrated in FIG. 4, the user interface providing apparatus 400 may include a surface acoustic signal acquisition unit 410, an acoustic signal processing unit 420, a feature extraction unit 430, a DB 440, a pattern determination unit 450, a time signal calculation unit 460, and a user input identification unit 470.

The surface acoustic signal acquisition unit 410 may perform the same or a similar function as the surface acoustic signal acquisition unit 210 of FIG. 2.

Figure 5A:
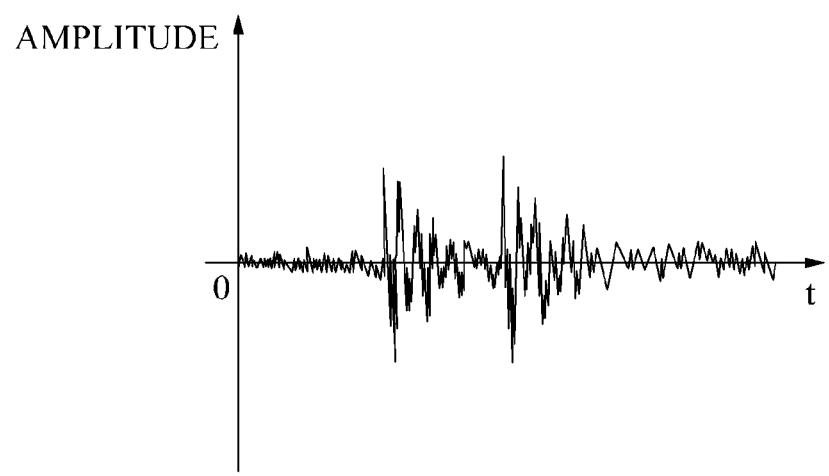
FIGS. 5A and 5B are diagrams illustrating examples of a signal output from a filter and a simplifier of FIG. 4.
Figure 5B:
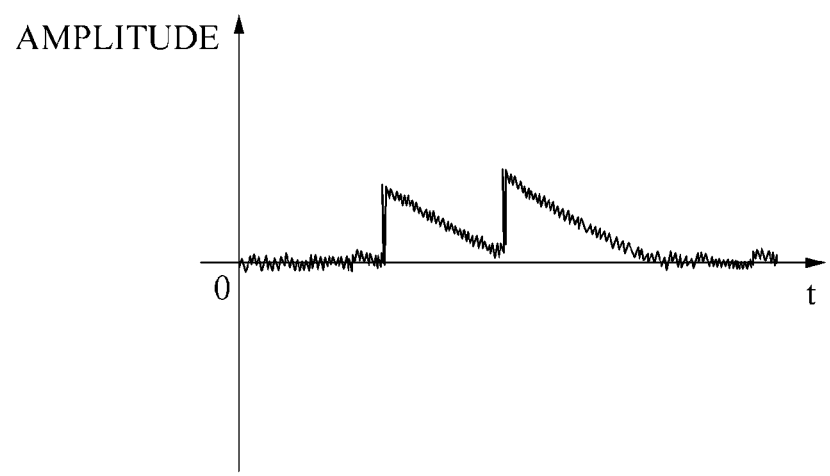

The acoustic signal processing unit 420 may filter noise from the surface acoustic signal and simplify a waveform of the noise-filtered surface acoustic signal. To filter noise and simplify the waveform, the acoustic signal processing unit 420 may include an amplifier 421, a filter 423, and a simplifier 425. The amplifier 421 may amplify the acquired surface acoustic signal. The filter 423 may filter the amplified surface acoustic signal selectively according to specific frequency ranges, thereby removing noise added to the amplified surface acoustic signal. For example, the filter 423 may consider a signal having a greater frequency than a maximum frequency of the surface acoustic signal, that is, 3 KHz, as a noise, and may thereby remove the noise. The simplifier 425 may simplify the noise-filtered surface acoustic signals to process more noise-filtered surface acoustic signals in real time. A signal illustrated in FIG. 5A is a surface acoustic signal output from the filter 423, and a signal illustrated in FIG. 5B is a simplified surface acoustic signal. The 'amplitude' of FIGS. 5A and 5B denotes strength or height of the signal and 't' denotes time. The simplifier 435 may determine the height of the signal, thereby simplifying the signal.

The acoustic signal processing unit 420 may output the simplified surface acoustic signal to the feature extraction unit 430, and may output the surface acoustic signal acquired by each sensor of the acoustic signal acquisition unit 410 to the time signal calculation unit 460.

The feature extraction unit 430 may perform the operation previously referred to as "1. Extraction of features of surface acoustic signal." That is, the feature extraction unit 430 may perform the same or a similar function as the feature extractor 221 of FIG. 2.

The DB 440 may store pattern models beneficial in recognizing the pattern of the surface acoustic signal and in identifying the user's input signal. For example, the 'pattern model of the minimal meaningful unit' and the 'machine learning model M' described in "1. Extraction of features of surface acoustic signal" may be stored in the DB 440. The pattern models may be stored according to the input tool. Also, the pattern model may be stored according to the medium type. Therefore, the feature extraction unit 430 may operate, for example, in the order of input tool estimation—input medium estimation—feature extraction, or, as in another example, in the order of input medium estimation—input tool estimation—feature extraction.

An example lookup table of the pattern models stored in the DB 440 is shown in Table 1.

An example lookup table of the functions of the device, corresponding to the user's input signal, is shown in Table 2.

TABLE 2

| Pattern model | Input tool | Input medium | Function corresponding to device |
|---|---|---|---|
| Continuous points (· ·) | Finger or pen | wood/iron | Power off |
| Dragging (→ or ←) | Finger or pen | wood/iron | Page up/down |
| Circle (◯) | Finger or pen | wood/iron | Music play |

The pattern determination unit 450 may function in a similar manner to the pattern analyzer 223 of FIG. 2. In addition, the pattern determination unit 450 may perform the operations previously referred to as "2. Estimation of type of medium propagating surface acoustic signal" and "3. Estimation of tool that generated the surface acoustic signal."

In an example in which the surface acoustic signal acquisition unit 410 includes at least two sensors, the time signal calculation unit 460 may calculate a time difference of the surface acoustic signals to reach the respective sensors. The time difference calculated by the time signal calculation unit 460 may be used to find the direction of the surface acoustic signal.

The user input identification unit 470 may perform the same or a similar function as the user input identification unit 230 of FIG. 2.

FIGS. 5A through 5B illustrate examples of a signal output from the filter 423 and the simplifier 425 of FIG. 4.

The signal illustrated in FIG. 5A is the surface acoustic signal output from the filter 423, and the signal illustrated in FIG. 5B is the simplified surface acoustic signal. The 'amplitude' of FIGS. 5A-5B denotes strength or height of the signal, and 't' denotes time. The simplifier 435 may determine the height of the signal, thereby simplifying the signal.

FIG. 6 is a diagram illustrating an example of the minimal meaningful units.

The minimal meaningful units illustrated in FIG. 6 may be used to recognize the pattern of the surface acoustic signal and to identify the user's input signal. For example, the

TABLE 1

| Time-domain features | | | | | | |
|---|---|---|---|---|---|---|
| Standard deviation among amplitudes | Zero-crossing | Length | Sum total of energy | Input tool | Input medium | Pattern model |
| 1.2 | 2 | 2 | 3 | Finger print | Glass plate | Point (·) |
| | | | | Nail | Desk | Horizontal line (—) |
| | | | | Ball-point pen | Hardcover of book | Vertical line (│ ) |
| 2 | 1 | 5 | 3 | Finger print | Glass plate | c (◡) |
| | | | | Nail | Desk | w (⋁) |
| | | | | Ball-point pen | Hardcover of book | Circle (◯) |
| ... | ... | ... | ... | ... | ... | ... | pattern recognition unit 220 of FIG. 2 may differentiate between the minimal meaningful units and the surface acoustic signal while the user input identification unit 230 may identify the user's input signal by combining the minimal meaningful units. In an example in which the user inputs ' I ', and ' ᄀ ' sequentially on the surface of the medium, the user input identification unit 230 may identify the user's input signal as 'M'.

FIGS. 7A-7D illustrate the frequency features of the surface acoustic signal according to the input tool.

A signal waveform magnitude, energy, frequency distribution, and the like may be varied according to characteristics of the input tool.

Figure 7A:
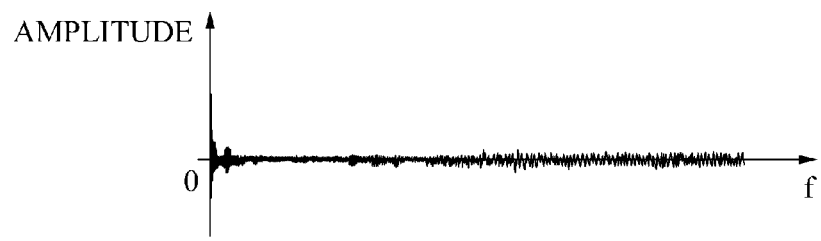
FIGS. 7A through 7D are diagrams illustrating frequency features of a surface acoustic signal depending on an input tool.
Figure 7B:
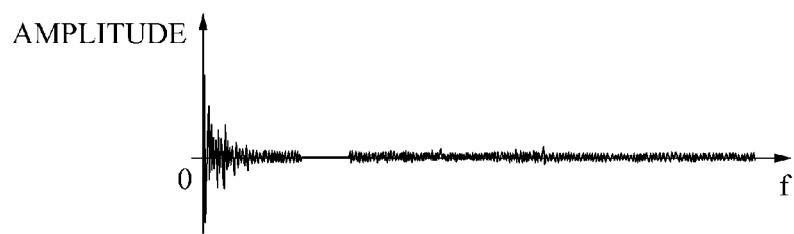
Figure 7C:
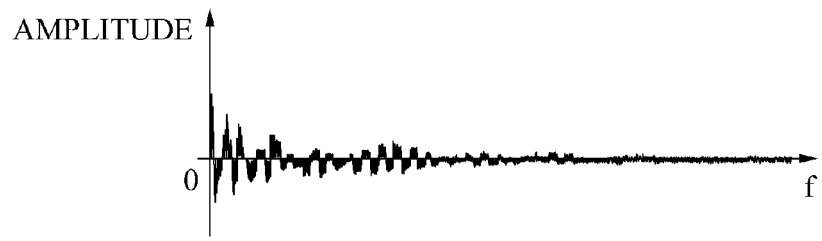
Figure 7D:
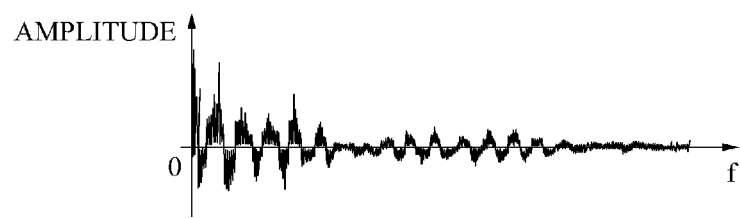

FIG. 7A illustrates the frequency features in a case in which the user draws a circle on the surface of the medium using a pen. FIG. 7B illustrates the frequency features in a case in which the user draws a circle on the medium surface using a finger. FIG. 7C illustrates the frequency features in a case in which the user draws a straight line using a finger. FIG. 7D illustrates the frequency features in a case in which the user draws a straight line using a pen. In the examples described with reference to FIGS. 7A through 7D, it is presumed that the medium is fixed.

Figure 8:
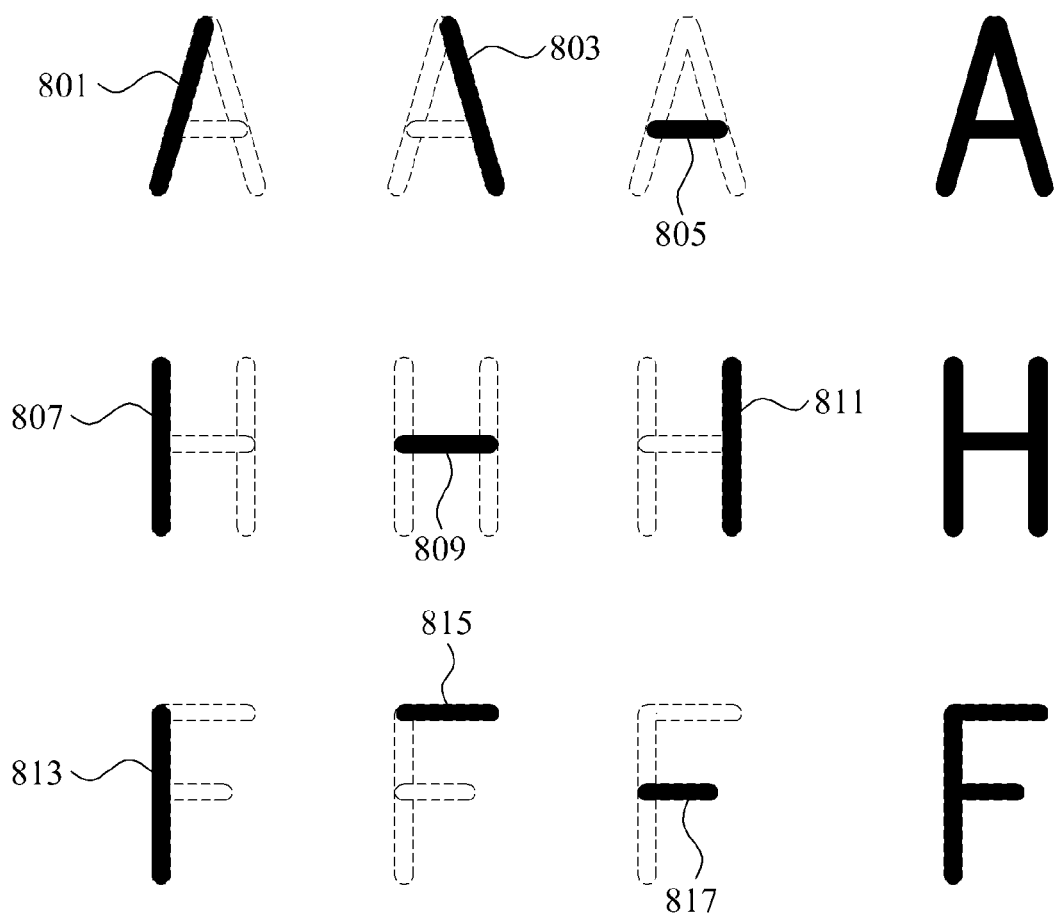
FIG. 8 is a diagram of an example of identifying a user's input signal in a case in which the user's input signal is a character.

FIG. 8 is a diagram of an example of identifying a user's input signal in a case in which the user's input signal is a character.

Referring to FIG. 8, a character 'A' may be expressed by inputting two long straight lines 801 and 803 and then one relatively shorter straight line 805. A character 'H' may be expressed by inputting a long straight line 807, a short straight line 809, and a long straight line 811, in the above sequence. The pattern showing the order of inputting such minimal meaningful units (straight line) may be used for identification of the character. In response to the user inputting a character 'F', the user input identification units 230 and 470 may identify the user's input signal by combining lengths and order of the straight lines 813, 815, and 817.

Figure 9:
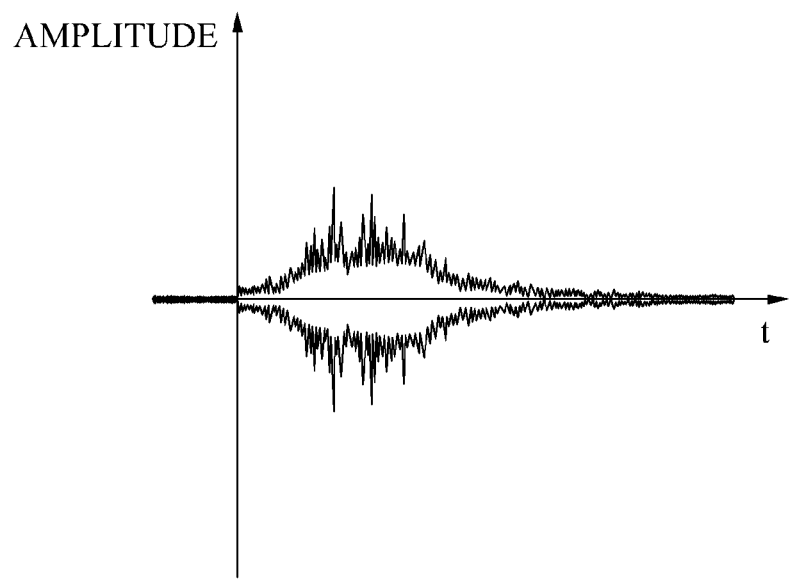
FIGS. 9 and 10 are diagrams each illustrating an example waveform corresponding to a straight line.
Figure 10:
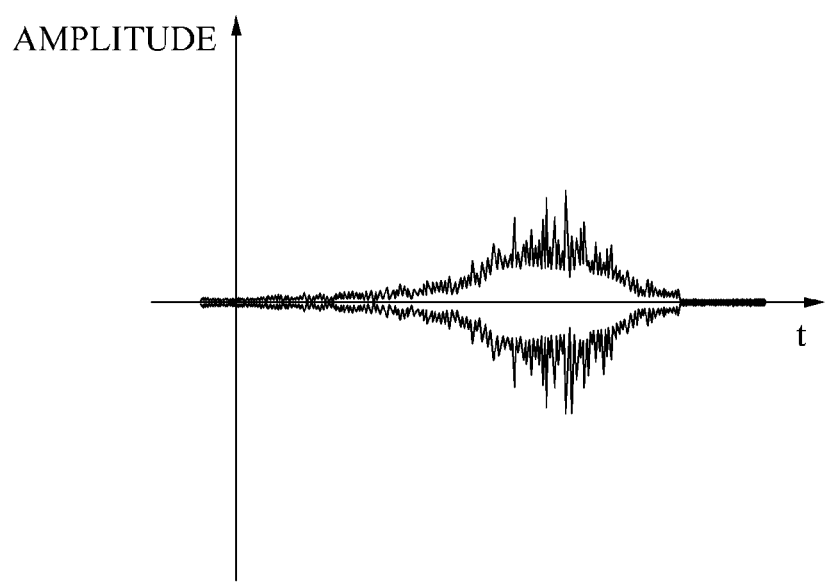

FIGS. 9 and 10 are diagrams each illustrating an example waveform corresponding to a straight line.

FIG. 9 illustrates a case in which the straight line starts near the acoustic sensor and ends far from the acoustic sensor. That is, the surface acoustic signal of FIG. 9 advances in a direction away from the acoustic sensor. In the description, the 'direction of the surface acoustic signal' is used as the same meaning as an advancing direction of the straight line.

FIG. 10 illustrates a case in which the straight line starts far from the acoustic sensor and ends near the acoustic sensor. That is, the surface acoustic signal of FIG. 10 advances in a direction toward the acoustic sensor.

Referring to FIGS. 9 and 10, the waveform of the surface acoustic signal may have a symmetrical shape with respect to the advancing direction of the straight line. Therefore, in a case in which the user interface providing apparatus is provided with a single acoustic sensor, the direction of the surface acoustic signal may be identified through a relative shape of the waveform. In a case in which the user interface providing apparatus is provided with at least two acoustic sensors, the direction of the surface acoustic signal may be estimated more precisely, rather than relying on the relative shape of the waveform through a single acoustic sensor.

Figure 11:
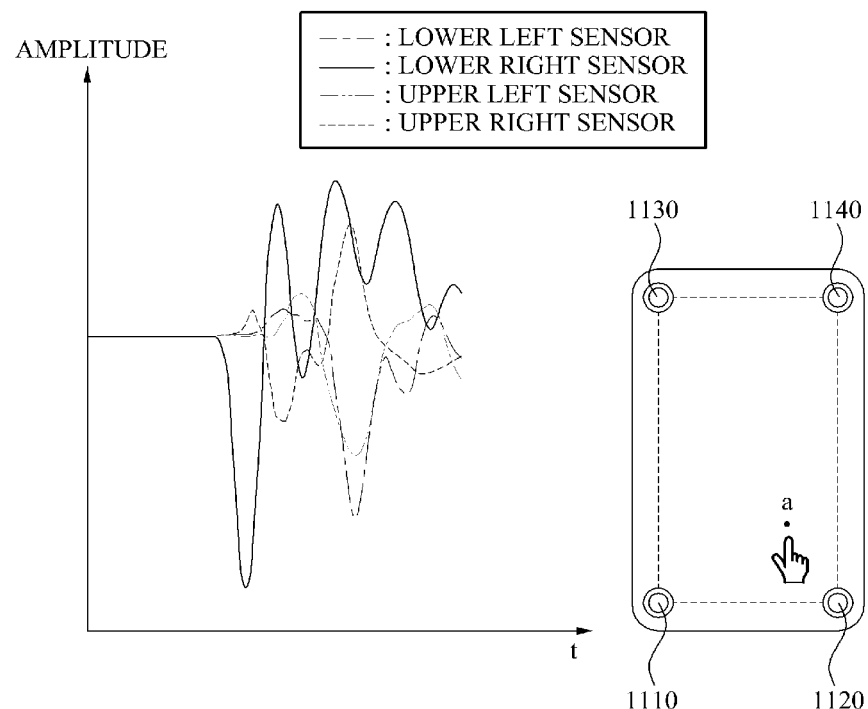
FIG. 11 is a diagram illustrating an example of a surface acoustic signal acquired in a case in which at least two acoustic sensors are provided to a user interface providing apparatus.

FIG. 11 is a diagram illustrating an example of the surface acoustic signal acquired in a case in which at least two acoustic sensors are provided to the user interface providing apparatus. In the actual example illustrated, four acoustic sensors have been provided, but the discussed features are not limited to this number. Also, while FIG. 11 illustrates a user making a sound at a position 'a' located within an area bounded by a plurality of sensors, such a configuration is simply to aid the ease of description. It is understood that the same or similar principles apply in examples in which the sound originating position is located outside of the device provided with such sensors.

Referring to FIG. 11, in a case in which the user makes a sound at the position 'a' with a finger, time points for the surface acoustic signal to be received to respective sensors 1110, 1120, 1130, and 1140 are different. In this example, the sensors 1110 to 1140 may be microphones provided to the surface acoustic signal acquisition unit 410. The time signal calculation unit 460 may estimate the position of the surface acoustic signal using the plurality of sensors 1110 to 1140. The time signal calculation unit 460 may determine a provisional position section of the surface acoustic signal by calculating delay times among the sensors 1110 to 1140, and may search for the position only within the provisional position section. The provisional position section may be a position at which the surface acoustic signal is generated.

Alternatively, to minimize the calculation process, the time signal calculation unit 460 may notify the user input signal identification unit 470 that a lower right sensor 1120 has first sensed the surface acoustic signal. In FIG. 11, since a peak of the surface acoustic signal detected by the lower right sensor 1120 is detected first, the time signal calculation unit 460 may determine that the lower right sensor 1120 first acquired the surface acoustic signal. By virtue of the lower right sensor 1120 detecting the surface acoustic signal first, it may be determined that the lower right sensor 1120 has the closest proximity to the position at which the surface acoustic signal is generated.

The user input signal identification unit 470 may identify the user's input signal by combining the pattern or minimal meaningful units being sequentially recognized. In addition, the user input signal identification unit 470 may determine the direction of the surface acoustic signal with a time difference value calculated by the time signal calculation unit 460.

In a case in which two sensors are provided, thereby forming two channels, the user input signal identification unit 470 may determine whether the surface acoustic signal is generated on the right or the left. For example, when the sensors are disposed on the right and the left, in a case in which the amplitude (magnitude of sound) of the surface acoustic signal acquired by the right sensor gradually decreases whereas the amplitude of the surface acoustic signal acquired by the left sensor gradually increases, the user input signal identification unit 470 may determine that the user performed dragging from the right to the left.

In a case in which four sensors are provided, thereby forming four channels, the user input signal identification unit 470 may determine the direction of the pattern or minimal meaningful unit using the time signal calculated by the time signal calculation unit 460. The user input signal identification unit 470 may determine the direction of the surface acoustic signal and 2D coordinates of the surface acoustic signal, using the time difference value input from the time signal calculation unit 460. For example, the user input signal identification unit 470 may determine the position of the sensor 1110 of FIG. 11 as reference coordinates (0, 0), and differentiate the direction of the surface acoustic signal, and may determine 2D coordinates of the surface acoustic signal generation position.

Alternatively, in the case of having the four channels, the user input signal identification unit 470 may determine the direction of the surface acoustic signal using the position of the sensor first sensing the surface acoustic signal. For example, the user input signal identification unit 470 may determine the direction of the surface acoustic signal by indicating north, south, east and west positions of the sensor 1120 of FIG. 11.

Figure 12:
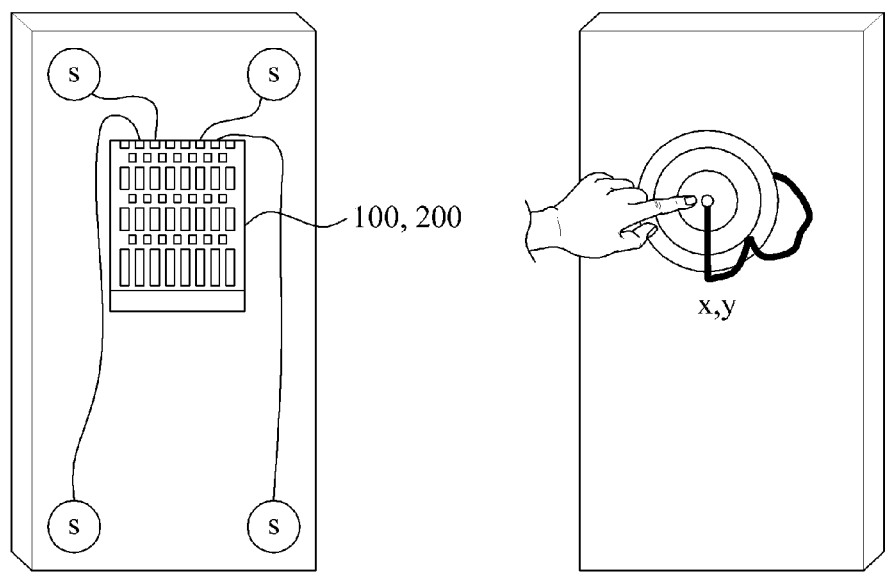
FIG. 12 is a diagram illustrating an example casing of a device.

FIG. 12 illustrates an example casing of a device provided with a surface acoustic signal acquisition unit and user interface providing apparatus. In this example, a sensor is provided to an external casing, and a character is input on a surface of the external casing. The casing may be made of plastic, metal, paper, and the like. The sensors S and the user interface providing apparatuses 100 and 200 may be attached to an inside of the casing. The user may generate the surface acoustic signal by a touch event on a surface of the casing.

While FIG. 12 illustrates a user making a sound at a position x,y located on the actual casing of the device itself, such a configuration is simply to aid the ease of description and to present an example. It is understood that the same or similar principles apply in examples in which the sound originating position is located outside of the device provided with such sensors, i.e., in the extended interface previously described.

Figure 13:
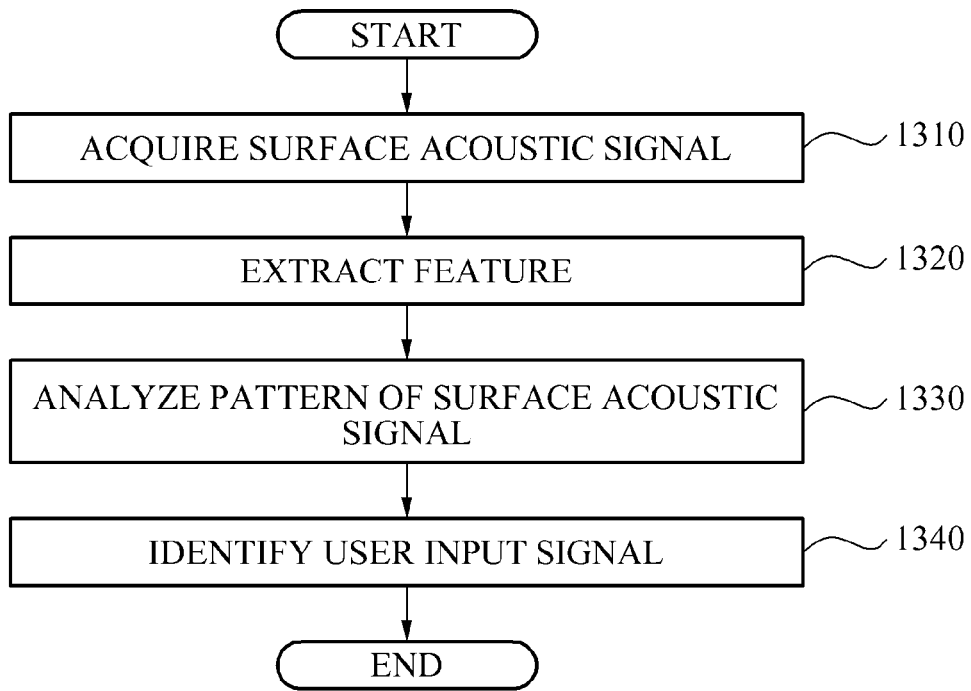
FIG. 13 is a flowchart illustrating an example of a method of providing a user interface of a device.
Figure 14:
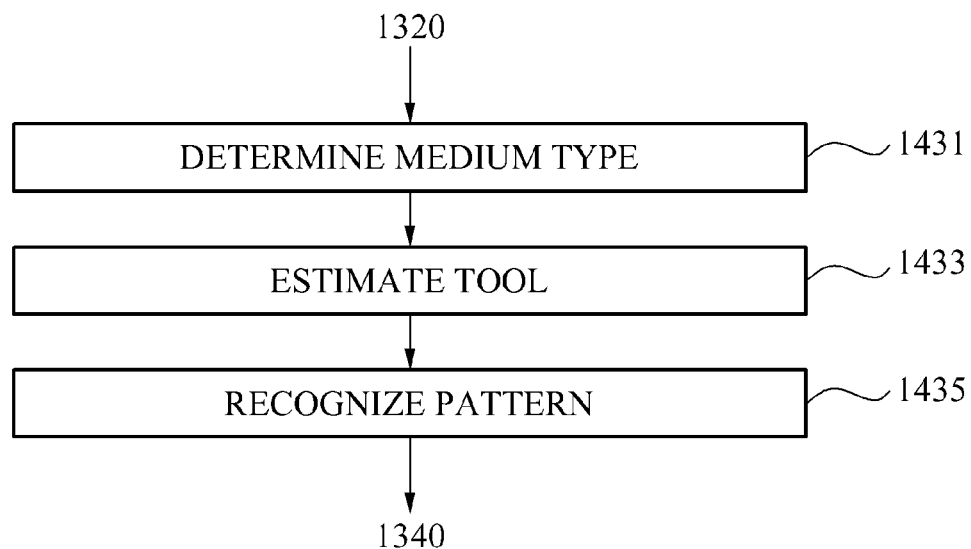
FIG. 14 is a flowchart illustrating an example of an operation of analyzing a pattern of the surface acoustic signal of FIG. 13.

FIG. 13 is a flowchart illustrating an example of a method of providing a user interface of the device, and FIG. 14 is a flowchart illustrating an example of an operation of analyzing a pattern of the surface acoustic signal of FIG. 13.

Referring to FIG. 13, the user interface providing apparatus may acquire the surface acoustic signal in operation 1310.

The user interface providing apparatus may extract the time-domain features and/or the frequency-domain features of the surface acoustic signal in operation 1320. That is, the user interface providing apparatus may perform the previously described "1. Extraction of features of surface acoustic signal." The time-domain features may include the amplitude of the surface acoustic signal, the distribution of the zero-crossing, an amount of energy, a length of the surface acoustic signal, a shape of the surface acoustic signal, or any combination thereof.

The user interface providing apparatus may analyze the pattern of the surface acoustic signal based on the time-domain features and/or the frequency-domain features in operation 1330. Operation 1330 may include specific processes illustrated in FIG. 14. That is, the user interface providing apparatus may determine the type of the medium using the test signal in operation 1431, may estimate a type of a tool that generated the surface acoustic signal based on the frequency-domain features of the surface acoustic signal in operation 1433, and may recognize the pattern of the surface acoustic signal considering the medium type and the tool generating the surface acoustic signal in operation 1435.

The user interface providing apparatus may identify the user's input signal based on the pattern of the surface acoustic signal in operation 1340. In other words, the user interface providing apparatus may perform the previously described "4. Identification of the user's input signal." According to an example, operation 1340 may include the processes of differentiating the minimal meaningful units matching the surface acoustic signal, and identifying the user's input signal based on the minimal meaningful units. According to to another example, operation 1340 may include the processes of receiving a plurality of the patterns sequentially and combining the minimal meaningful units corresponding to the respective patterns, thereby identifying the user's input signal.

Figure 15:
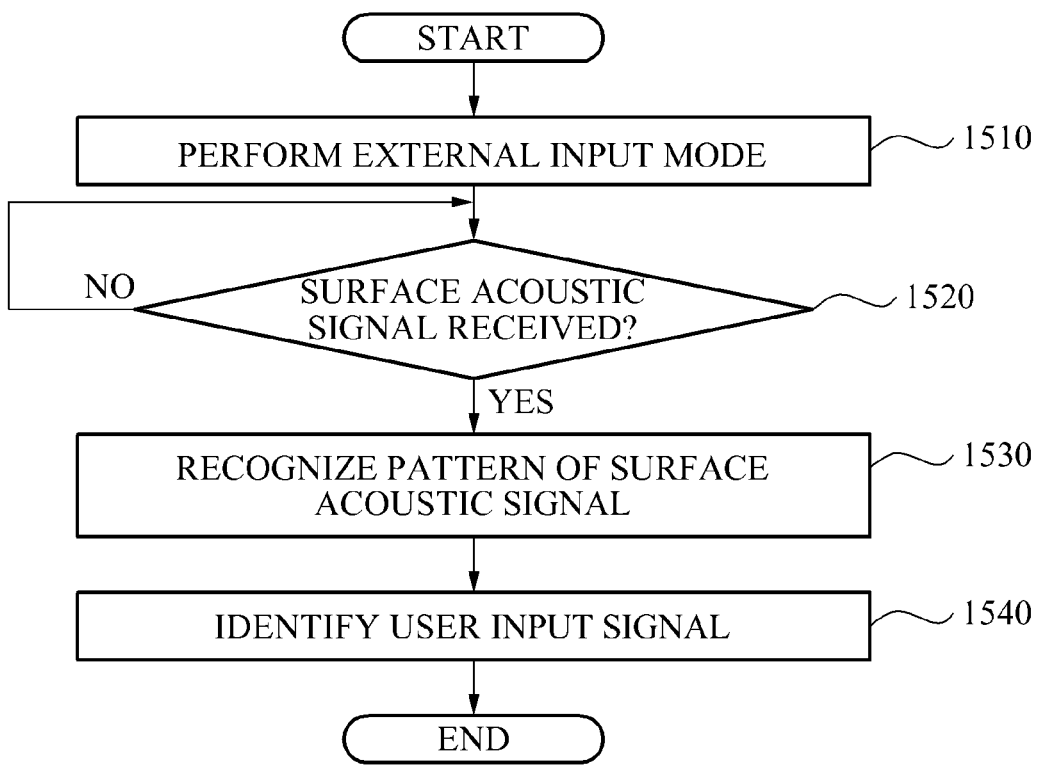
FIG. 15 is a flowchart illustrating another example of a method of providing a user interface of the device.

FIG. 15 is a flowchart illustrating another example of a method of providing a user interface.

Referring to FIG. 15, in operation 1510, the user interface providing apparatus may be set to an external input mode to receive the user's input signal through a medium disposed outside of the device. The 'external input mode' refers to a mode in which the device 120 is operable through, for example, the outside medium 110 of FIG. 1. In an example in which the external input mode is performed, the device may activate one or more acoustic sensors which may previously be in an inactive state. The external input mode may be triggered by contact between the device and the outside medium, by a control signal for mode conversion, and the like.

In operation 1520, the user interface providing apparatus may determine whether the surface acoustic signal is received from the outside medium of the device.

In a case in which the surface acoustic signal is received from the outside medium, the user interface providing apparatus may analyze the features of the surface acoustic signal, thereby recognizing the pattern of the surface acoustic signal, in operation 1530.

In operation 1540, the user interface providing apparatus may identify the user's input signal based on the pattern of the surface acoustic signal.

Figure 16:
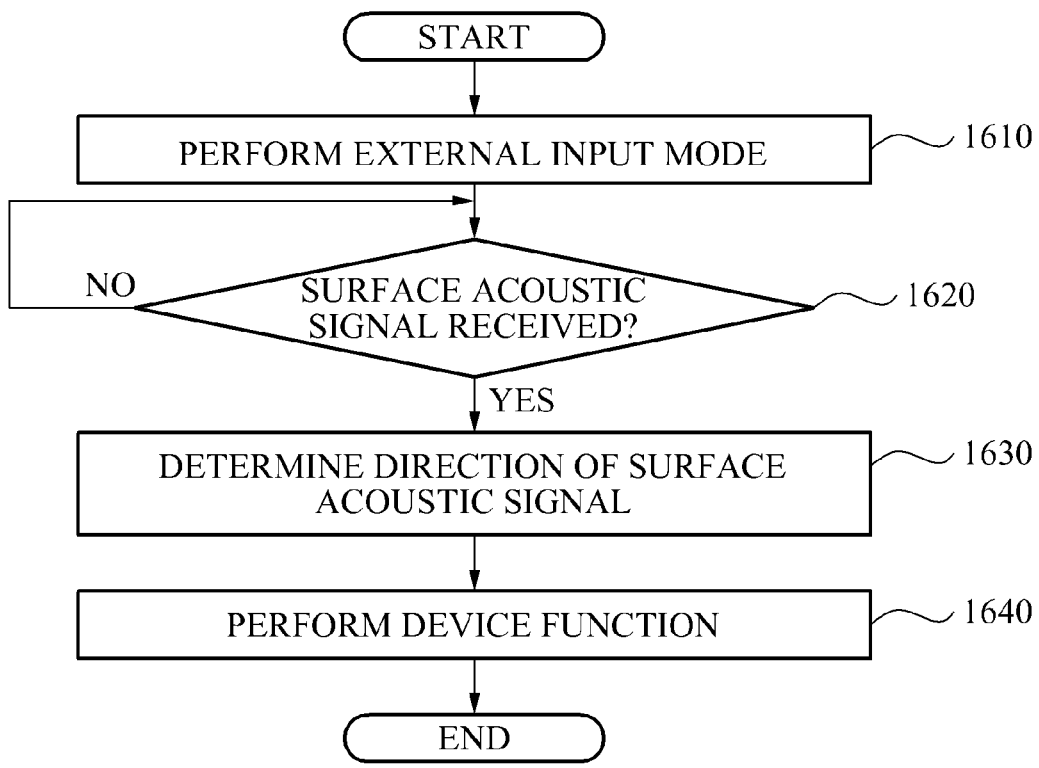
FIG. 16 is a flowchart illustrating still another example of a method of providing a user interface of the device.

FIG. 16 is a flowchart illustrating still another example of a method of providing a user interface.

Referring to FIG. 16, the user interface providing apparatus may be set to the external input mode to receive the user's input signal from the medium disposed outside of the device, in operation 1610. The user interface providing apparatus may also determine the type of the medium by generating the test signal, analyzing features of the test signal on the outside medium, and comparing the features of the test signal with the pattern model stored in advance.

In operation 1620, the user interface providing apparatus may determine whether the surface acoustic signal is received from the outside medium of the device.

Upon reception of the surface acoustic signal from the outside medium, the user interface providing apparatus may determine the direction of the surface acoustic signal in operation 1630. For example, the user interface providing apparatus may determine dragging direction of a user's gesture such as writing, drawing, and the like. The direction of the surface acoustic signal may be determined by the 'shape of the waveform of the surface acoustic signal', 'time difference between a first surface acoustic signal received to a first acoustic sensor and a second surface acoustic signal received to a second acoustic sensor', and 'variation of sizes of the first surface acoustic signal and the second surface acoustic signal', or any combination thereof.

In operation 1640, the user interface providing apparatus may perform a function of the device corresponding to the direction of the surface acoustic signal. For example, according to a setup of the device, in a case in which dragging in a predetermined direction is input after an application program for playing music or a motion picture is executed, the music or motion picture may be played.

As a non-exhaustive illustration only, a terminal or terminal device described herein may refer to mobile devices such as a cellular phone, a personal digital assistant (PDA), a digital camera, a portable game console, an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein. The device, terminal, or terminal device may also be provided as an additional or integrated component on any number of home appliances such as a refrigerator, cooking range, washing machine, television, etc., either fixed or mobile.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus to provide a user interface of a device, comprising:
   a surface acoustic signal acquisition unit configured to acquire a surface acoustic signal propagated through a medium disposed outside of the device;
   a pattern recognition unit configured to (1) estimate a type of a medium using a test signal, (2) estimate a tool generating the surface acoustic signal based on frequency-domain features of the surface acoustic signal and (3) recognize a pattern of the surface acoustic signal based on the type of the medium and the tool by analyzing features of the surface acoustic signal, the pattern recognition unit comprising
      a feature extractor configured to extract at least one time-domain feature of the surface acoustic signal, and
      a pattern analyzer configured to analyze the pattern of the surface acoustic signal based on the at least one time-domain feature, the type of the medium and the tool; and
   a user input identification unit configured to identify a user's input signal by classifying minimal meaningful units corresponding to the pattern of the surface acoustic signal and combining the minimal meaningful units to form one or more input characters.

2. The apparatus of claim 1, wherein the medium is provided to the user through an object contacting the device.

3. The apparatus of claim 2, wherein the surface acoustic signal acquisition unit comprises:
   a medium contactor to receive the surface acoustic signal by contacting the object; and
   an acoustic sensor to convert the surface acoustic signal to a digital signal.

4. The apparatus of claim 1, wherein the medium is provided to the user through an external casing of the device.

5. The apparatus of claim 1, wherein:
   the feature extractor is configured to extract at least one frequency-domain feature; and
   the pattern analyzer is configured to analyze the pattern of the surface acoustic signal based on the at least one frequency-domain feature.

6. The apparatus of claim 1, wherein the at least one time-domain feature comprises an amplitude of the surface acoustic signal, a distribution of a zero-crossing, an amount of energy, a length of the surface acoustic signal, and/or a shape of the surface acoustic signal.

7. The apparatus of claim 1, wherein the user input identification unit identifies the user's input signal by receiving a plurality of patterns sequentially from the pattern recognition unit and by combining minimal meaningful units corresponding to the plurality of patterns.

8. The apparatus of claim 1, wherein the pattern comprises information corresponding to a direction of the surface acoustic signal, and
   the user input identification unit identifies the user's input signal based on the information corresponding to the surface acoustic signal direction.

9. The apparatus of claim 1, further comprising a pattern model storage unit to store pattern models of the surface acoustic signal, classified according to a type of the medium and/or an input tool.

10. The apparatus of claim 1, wherein the user's input signal comprises a character, a figure, a dragging, a touch event, or any combination thereof, which are input through the medium.

11. The apparatus of claim 1, wherein the at least one time-domain feature comprises a total sum of energy based on a summation of discrete energy measurements distributed over a length of time.

12. The apparatus of claim 1, wherein the amplitude of the signals are used to identify a straight line, a curve line, a bent line, being input onto the medium.

13. The apparatus of claim 1, wherein the feature extractor is configured to extract specific features of the corresponding signal using a zero-crossing distribution and a variation of the zero-crossing distribution such that the distribution of the zero-crossing denotes a number of spots at which a sign of the signal changes.

14. The apparatus of claim 1, wherein the tool is a stylus.

15. A method of providing a user interface of a device, the method comprising:
   acquiring a surface acoustic signal;
   extracting at least one time-domain feature of the surface acoustic signal;
   determining a type of a medium using a test signal;
   estimating a tool generating the surface acoustic signal based on frequency-domain features of the surface acoustic signal;
   analyzing a pattern of the surface acoustic signal based on the at least one time-domain feature, the type of the medium and the tool; and
   identifying a user's input signal by classifying minimal meaningful units corresponding to the pattern of the surface acoustic signal and combining the minimal meaningful units to form one or more input characters.

16. The method of claim 15, wherein the identifying comprises:
   receiving a plurality of patterns sequentially; and
   identifying the user's input signal by combining minimal meaningful units corresponding to the patterns.

17. The method of claim 15, wherein the surface acoustic signal is generated by contact between the medium and the user's hand.

18. The method of claim 15, wherein the surface acoustic signal is generated by contact between the medium and a tool being used by the user.

19. The method of claim 15, wherein the surface acoustic signal is acquired in a state in which the device is in contact with the medium.

20. The method of claim 15, comprising:
- extracting at least one frequency domain feature of the surface acoustic signal; and
- analyzing the pattern of the surface acoustic signal based on the at least one frequency domain feature.

21. A method of providing a user interface of a device, the method comprising:
- acquiring an acoustic signal generated by a user interacting with a medium of an object outside of the device;
- analyzing the acquired acoustic signal through a process that comprises separating the surface acoustic signal into a plurality of frames based on at least one time-domain feature of the acquired acoustic signal; and
- identifying the user's input signal by classifying minimal meaningful units corresponding to a pattern of the acoustic signal and combining the minimal meaningful units to form one or more input characters.

\* \* \* \* \*